(12) United States Patent
Yang et al.

(10) Patent No.: US 11,307,464 B2
(45) Date of Patent: Apr. 19, 2022

(54) ARRAY SUBSTRATE FOR REFLECTIVE DISPLAY PANEL, METHOD FOR PREPARING THE SAME AND DISPLAY PANEL

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Guanglei Yang, Beijing (CN); Zhixiang Fang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 265 days.

(21) Appl. No.: 16/561,837

(22) Filed: Sep. 5, 2019

(65) Prior Publication Data
US 2020/0264480 A1 Aug. 20, 2020

(30) Foreign Application Priority Data

Feb. 15, 2019 (CN) .......................... 201910117578.8

(51) Int. Cl.
G02F 1/1343 (2006.01)
G02F 1/1335 (2006.01)
G02F 1/1362 (2006.01)

(52) U.S. Cl.
CPC .... *G02F 1/134309* (2013.01); *G02F 1/13439* (2013.01); *G02F 1/133553* (2013.01); *G02F 1/136209* (2013.01); *G02F 2201/121* (2013.01); *G02F 2201/123* (2013.01); *G02F 2203/02* (2013.01)

(58) Field of Classification Search
None
See application file for complete search history.

(56) References Cited

U.S. PATENT DOCUMENTS

2008/0273130 A1* 11/2008 Tung ................. G02F 1/136227
349/38
2009/0174849 A1 7/2009 Takano et al.
2014/0232972 A1* 8/2014 Kim ...................... G06F 3/0412
349/113

(Continued)

FOREIGN PATENT DOCUMENTS

CN 1347516 A 5/2002
CN 2826474 Y 10/2006
(Continued)

OTHER PUBLICATIONS

First Office Action for Chinese Application No. 201910117578.8, dated Mar. 18, 2021, 9 Pages.

*Primary Examiner* — Ryan Crockett
(74) *Attorney, Agent, or Firm* — Brooks Kushman P.C.

(57) ABSTRACT

The present disclosure provides an array substrate for a reflective display panel, a method for preparing the same, and a display panel, the array substrate including a base and a pixel electrode and a structure for reflecting light arranged on the base, in which the structure for reflecting light is configured to reflect light at a predetermined wavelength and allow light other than the light at the predetermined wavelength to transmit therethrough.

19 Claims, 6 Drawing Sheets

(56) References Cited

U.S. PATENT DOCUMENTS

| | | | |
|---|---|---|---|
| 2016/0004132 A1* | 1/2016 | Lin | G02F 1/136209 |
| | | | 349/108 |
| 2017/0184895 A1* | 6/2017 | Xu | G02F 1/134363 |
| 2018/0107061 A1 | 4/2018 | Zhong | |
| 2018/0188618 A1* | 7/2018 | Ge | H01L 27/127 |
| 2019/0235330 A1* | 8/2019 | Park | G02F 1/133514 |
| 2020/0257166 A1* | 8/2020 | Smith | G02F 1/1368 |

FOREIGN PATENT DOCUMENTS

| | | |
|---|---|---|
| CN | 101482666 A | 7/2009 |
| CN | 101561525 A | 10/2009 |
| CN | 202837750 U | 3/2013 |
| CN | 105717702 A | 6/2016 |
| JP | H11337932 A | 12/1999 |

\* cited by examiner

--Prior Art--

ARRAY SUBSTRATE FOR REFLECTIVE DISPLAY PANEL, METHOD FOR PREPARING THE SAME AND DISPLAY PANEL

CROSS-REFERENCE TO RELATED APPLICATION

This application claims priority to Chinese Patent Application No. 201910117578.8 filed on Feb. 15, 2019, which is incorporated herein by reference in its entirety.

TECHNICAL FIELD

The present disclosure relates to the field of display technology, in particular, to an array substrate for a reflective display panel, a method for preparing the same, and a display panel including the array substrate.

BACKGROUND

Reflective display panel products have the advantages of light weight and thin thickness, no backlight, energy saving and eye protection, and have always been the research focus of various display product manufacturers. The electronic ink (E-INK) reflective products sold on the market have high reflectivity and good readability, but the extremely low refresh rate and the inability to display in color are their Achilles heel. Reflective liquid crystal displays (LCD) can realize color display and has a relatively high refresh rate, but the light beam in the reflective liquid crystal display needs to be transmitted through the color film for several times, resulting in a loss of light energy of about 80%, thereby achieving a relatively low reflectivity and a relatively poor display. Therefore, the current reflective liquid crystal display still needs further improvement.

SUMMARY

In one aspect, the present disclosure provides an array substrate for a reflective display panel, including: a base and a pixel electrode and a structure for reflecting light arranged on the base, in which the structure for reflecting light is configured to reflect light at a predetermined wavelength and allow light other than the light at the predetermined wavelength to transmit therethrough.

Optionally, the structure for reflecting light is arranged on a surface of the pixel electrode away from the base.

Optionally, the pixel electrode is a transparent electrode, and the structure for reflecting light is arranged on a surface of the pixel electrode proximate to the base.

Optionally, the array substrate further includes a common electrode, the common electrode is arranged on a surface of the pixel electrode away from the base, and the structure for reflecting light is arranged on a surface of the common electrode away from the base.

Optionally, the common electrode is a transparent electrode, the common electrode is arranged on a surface of the pixel electrode away from the base, and the structure for reflecting light is arranged on a surface of the common electrode proximate to the base.

Optionally, the structure for reflecting light is a metal oxide film, a polymer film composed of a plurality of stacked polymer layers, or an aluminum film doped with non-ferrous metal ions.

Optionally, the metal oxide film includes at least one selected from a group consisting of a tantalum pentoxide film, a cuprous oxide film, a ferrous oxide film, and a copper oxide film.

Optionally, each polymer layer in the polymer film has a reflectivity to the light at the predetermined wavelength greater than a reflectivity to light other than the light at the predetermined wavelength, its thickness is a quarter of the predetermined wavelength, and a refractive index of the polymer layers gradually decreases in a direction from the base to the polymer film.

Optionally, the aluminum film doped with non-ferrous metal ions includes an aluminum film doped with cuprous ions, an aluminum film doped with ferrous ions, and an aluminum film doped with copper ions.

Optionally, the array substrate further includes a light absorbing layer arranged on a surface of the base away from the pixel electrode.

Optionally, a material constituting the light absorbing layer is a black resin.

Optionally, the structure for reflecting light is arranged on a surface of the pixel electrode away from the base, and the pixel electrode has a function of absorbing light.

Optionally, the array substrate further includes a common electrode, the common electrode is arranged on a surface of the pixel electrode away from the base, and the structure for reflecting light is arranged on a surface of the common electrode away from the base; and the common electrode has a function of absorbing light.

Optionally, the common electrode includes a transparent conductive oxide layer and a ferrous metal layer that are laminated.

Optionally, the pixel electrode includes a transparent conductive oxide layer and a ferrous metal layer that are laminated.

In another aspect, the present disclosure also provides a method for preparing the above array substrate for a reflective display panel, including: forming a pixel electrode and a structure for reflecting light on the base by a patterning process, in which the structure for reflecting light is configured to reflect light at a predetermined wavelength and allow light other than the light at the predetermined wavelength to transmit therethrough.

Optionally, the structure for reflecting light is arranged on a surface of the pixel electrode away from the base or on a surface of the pixel electrode proximate to the base, and the pixel electrode and the structure for reflecting light are formed by a same mask.

Optionally, the structure for reflecting light is arranged on a surface of the common electrode proximate to the base or on a surface of the common electrode away from the base, and the common electrode and the structure for reflecting light are formed by a same mask.

Optionally, the method further includes a step of forming a light absorbing layer on a surface of the base away from the pixel electrode.

In still another aspect, the present disclosure also provides a display panel, including an upper substrate and a lower substrate arranged opposite to each other, and a liquid crystal layer arranged between the lower substrate and the upper substrate, in which the lower substrate is the above array substrate.

Optionally, the structure for reflecting light is arranged on a surface of the pixel electrode away from the base; or the pixel electrode is a transparent electrode, and the structure for reflecting light is arranged on a surface of the pixel electrode proximate to the base.

Optionally, the array substrate further includes a common electrode, the common electrode is arranged on a surface of the pixel electrode away from the base, in which the structure for reflecting light is arranged on a surface of the common electrode away from the base; or the common electrode is a transparent electrode, and the structure for reflecting light is arranged on a surface of the common electrode proximate to the base.

DETAILED DESCRIPTION

Detailed description will be described in detail below. The embodiments described below are merely illustrative of the technical solutions of the present disclosure, but are not to be construed as limiting to the technical solutions or the protection scope of the present disclosure.

Figure 1:
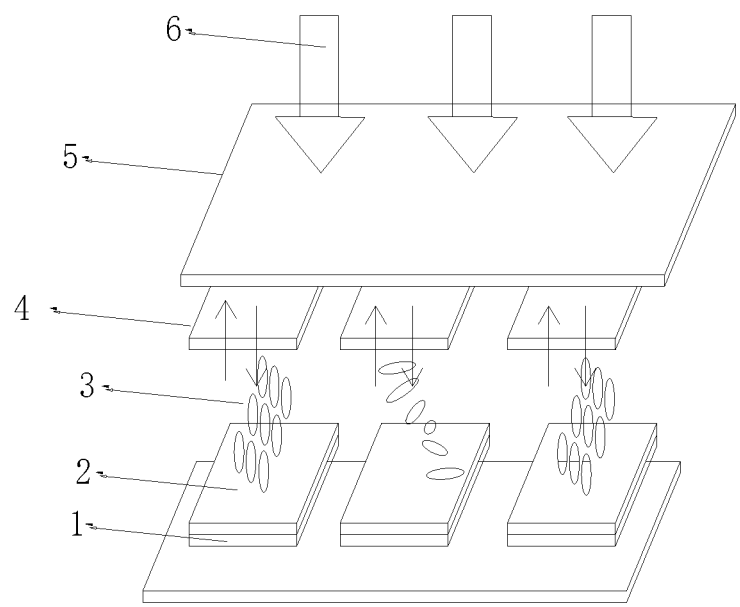
FIG. 1 is a schematic view showing a reflective display panel in the related art.

A reflective liquid crystal display (LCD) can realize color display and have a relatively high refresh rate. The structure of the related reflective liquid crystal display can be referred to FIG. 1. As shown in FIG. 1, an A1 reflective layer 2 is coated on the pixel electrode 1. Ambient white light 6 is incident from upward side, and passes through the polarizer 5 and the color film 4 in sequence to form three primary colors, which are modulated by a liquid crystal 3 and reflected by the reflective layer 2, and emitted through a color film 4 and a polarizer 5 to realize color display. As can be seen, the light in the reflective liquid crystal display needs to be transmitted through the color film 4 twice, resulting in a loss of light energy of 80%, thereby achieving a relatively low reflectivity and a relatively poor display.

The present disclosure is directed to solving the above technical problems in the related art. Thus, an object of the present disclosure is to provide an array substrate, a method for preparing the same and a display panel including the array substrate, in which the array substrate can improve the reflectivity of the reflective display panel or improve the display effect.

An aspect of the present disclosure provides an array substrate for a reflective display panel, including: a base and a pixel electrode and a structure for reflecting light arranged on the base, in which the structure for reflecting light is configured to reflect light at a predetermined wavelength and allow light other than the light at the predetermined wavelength to transmit therethrough.

The structure for reflecting light of the array substrate according to an embodiment of the present disclosure reflects only light at a predetermined wavelength, and thus the incident ambient light can be converted into the light of a targeted color as needed, thereby achieving color display. Moreover, when the array substrate is applied to a display panel, it is not necessary to provide a color film layer, thereby greatly improving the utilization rate and the reflectivity of the incident light, and improving the display effect of the reflective liquid crystal display panel.

In the present disclosure, the term "light at a predetermined wavelength" means the light of a specific wavelength value, for example, the light of a wavelength of 480 nm; or means the light of a specific wavelength range, for example, the light of a wavelength from 460 nm to 480 nm. In the present disclosure, the term "light other than the light at the predetermined wavelength" means light other than the light at the predetermined wavelength in ambient white light. For example, if the light at the predetermined wavelength is 480 nm, the light other than the light at the predetermined wavelength means the light of all wavelength other than 480 nm; and if the light at the predetermined wavelength is 460 nm to 480 nm, the light other than light at the predetermined wavelength means the wavelength less than 460 nm and the wavelength greater than 480 nm.

The specific kind of the above substrate is not particularly limited, and can be selected flexibly by one skilled in the art according to needs. In some embodiments of the present disclosure, the substrate may be a glass substrate, a polymer substrate, or the like.

Figure 2:
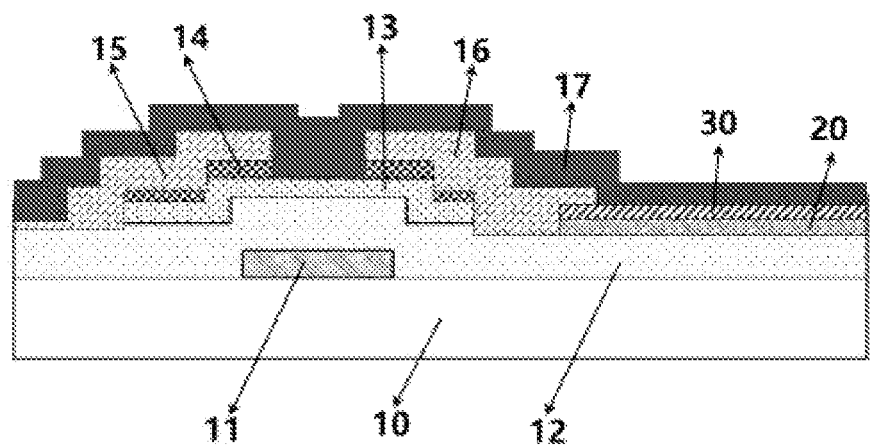
FIG. 2 is a schematic view showing an array substrate of one embodiment of the present disclosure.
Figure 3:
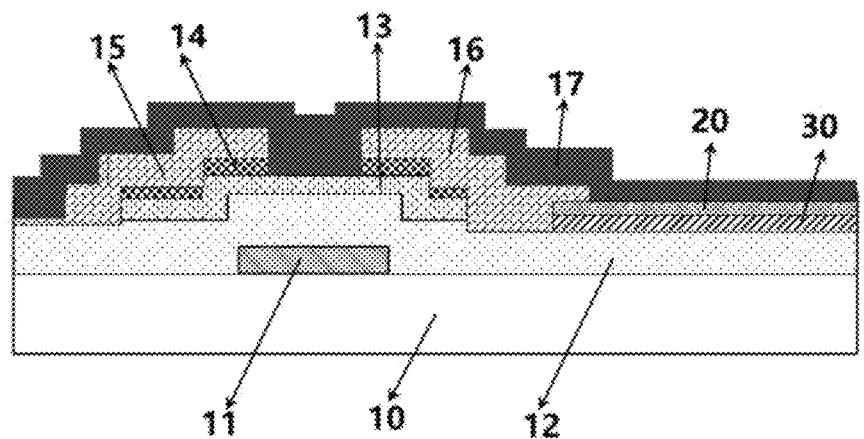
FIG. 3 is a schematic view showing an array substrate of another embodiment of the present disclosure.

The specific arrangement position is not particularly limited as long as the structure for reflecting light can effectively reflect the light of the predetermined color to realize color display. In some embodiments, the structure for reflecting light 30 is arranged on a surface of the pixel electrode 20 away from the base 10, as shown in FIG. 2. In other embodiments, the pixel electrode 20 is a transparent electrode, and the structure for reflecting light 30 is arranged on a surface of the pixel electrode 20 proximate to the base 10, as shown in FIG. 3.

Figure 4:
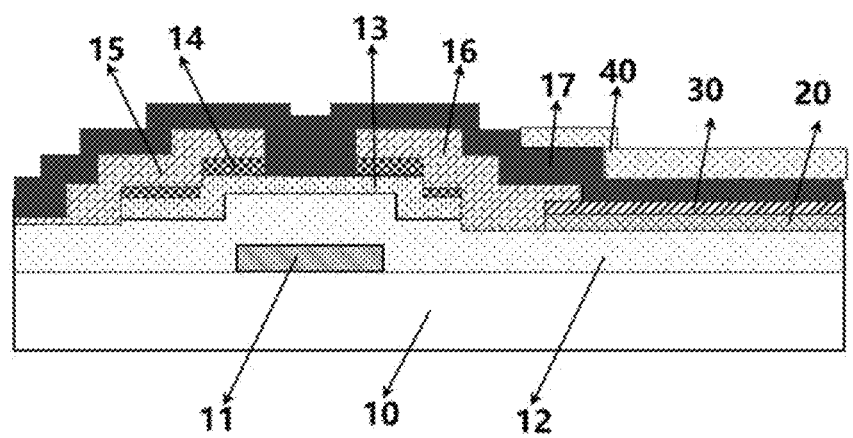
FIG. 4 is a schematic view showing an array substrate of another embodiment of the present disclosure.
Figure 5:
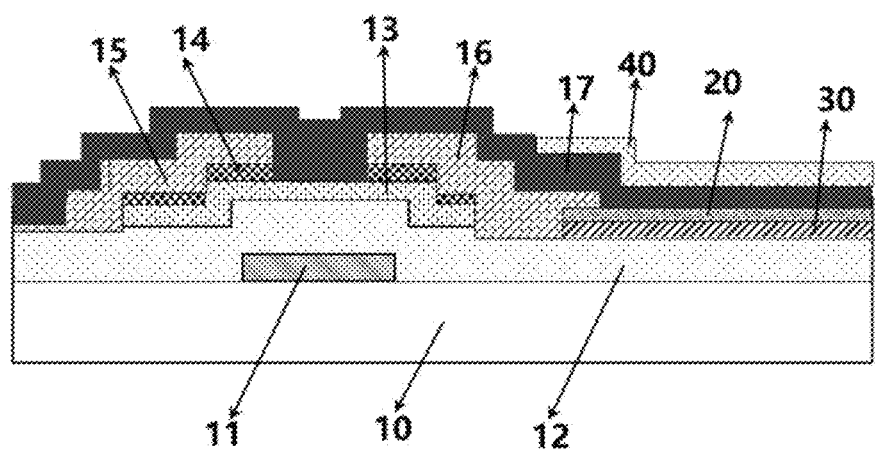
FIG. 5 is a schematic view showing an array substrate of another embodiment of the present disclosure.
Figure 6:
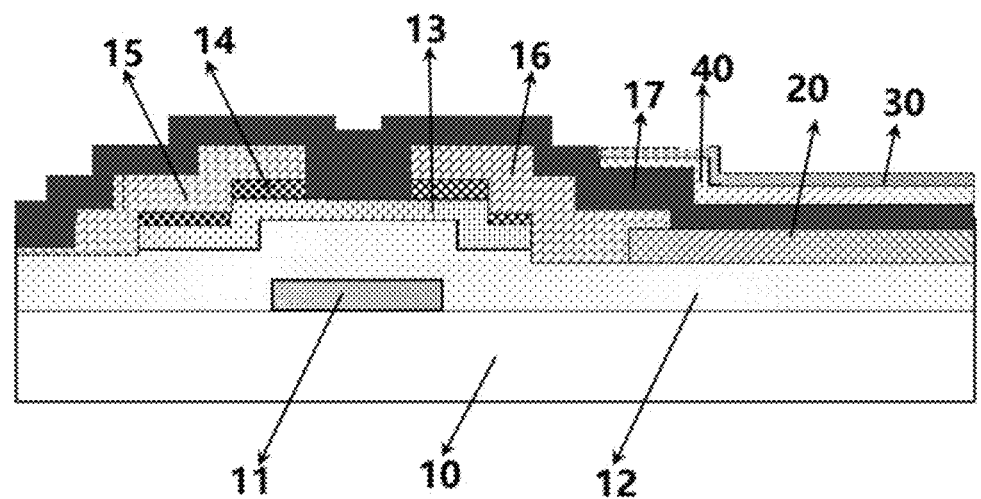
FIG. 6 is a schematic view showing an array substrate of another embodiment of the present disclosure.
Figure 7:
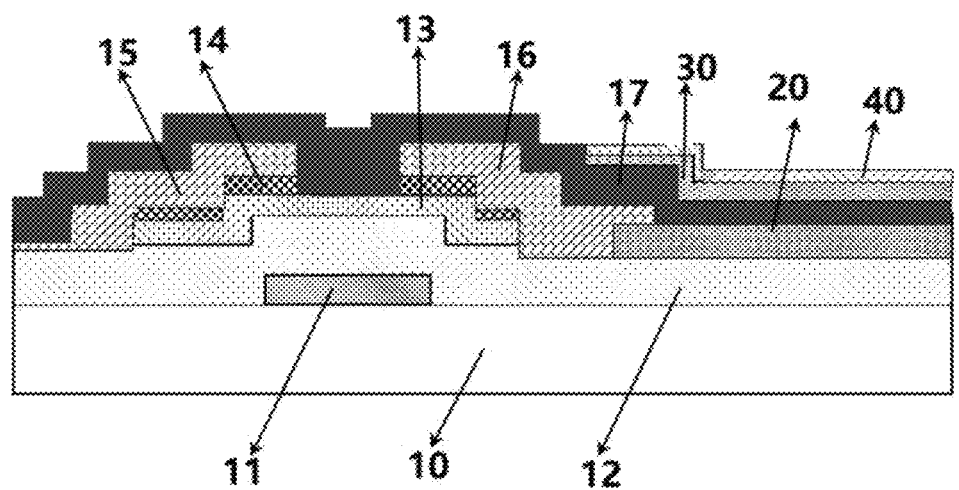
FIG. 7 is a schematic view showing an array substrate of another embodiment of the present disclosure.

According to further embodiments of the present disclosure, the array substrate further includes a common electrode 40. Optionally, the common electrode 40 is arranged on a surface of the pixel electrode 20 away from the base 10. In some embodiments, the structure for reflecting light 30 is arranged on a surface of the pixel electrode 20 away from the base 10, as shown in FIG. 4. In other embodiments, the pixel electrode 20 is a transparent electrode, and the structure for reflecting light 30 is arranged on a surface of the pixel electrode 20 proximate to the base 10, as shown in FIG. 5. In still other embodiments, the structure for reflecting light 30 is arranged on a surface of the common electrode 40 away from the base 10. In other embodiments, the common electrode 40 is a transparent electrode, and the structure for reflecting light 30 is arranged on a surface of the common electrode 40 proximate to the base 10, as shown in FIG. 7. Therefore, under the condition that the light of the predetermined color can be effectively realized, the preparation steps of the array substrate are simple, have a high compatibility with the existing process, require no additional equipment, are easy to implement, and have a low cost.

The light at the predetermined wavelength may be flexibly adjusted according to the need of color display. In some embodiments, the light at the predetermined wavelength may include red, blue, and green light, and thus color display can be achieved by the three primary colors. Of course, one skilled in the art can understand that the reflecting light structures for reflecting light of different colors are distributed on the base in a predetermined arrangement. Optionally, the specific arrangement manner of the structure for reflecting light may be consistent with the pixel arrangement manner of the display panel, and is not described herein again.

Figure 8:
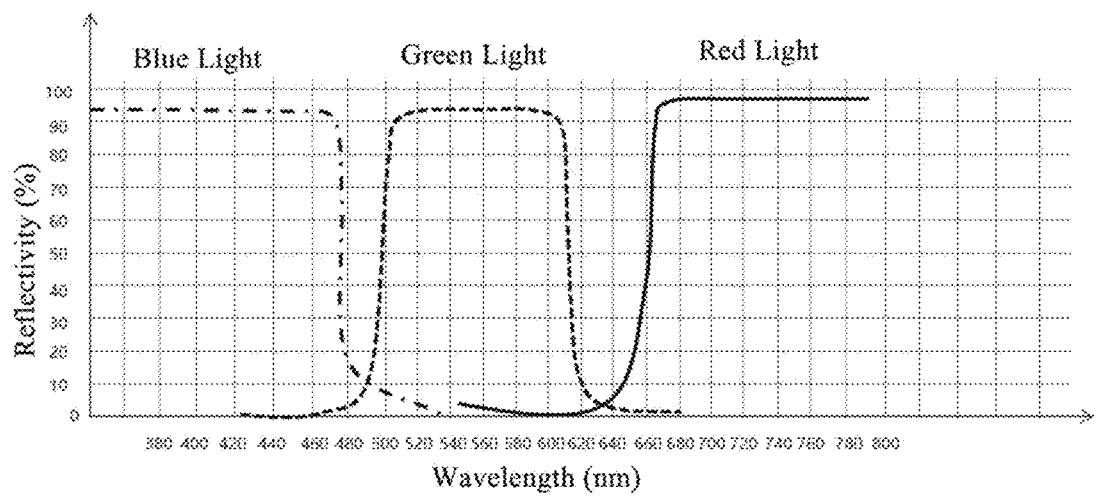
FIG. 8 is a chart of reflectivity test results for the reflecting light structures for reflecting a red light, a green light, and a blue light, respectively, according to an embodiment of the present disclosure.

According to an embodiment of the present disclosure, the reflective light structure may be an oxide film, a polymer film composed of a plurality of stacked polymer layers, or aluminum film doped with non-ferrous metal ions. The structure for reflecting light constructed as the above can effectively reflect light at a predetermined wavelength and allow light at other wavelengths than the predetermined wavelength to transmit therethrough. Further, the adjustment of reflected light and emissivity can be achieved by adjusting the composition, thickness, and optical parameters (such as refractive index) of each film as needed. In some embodiments, the reflectivity of the reflecting light structures for reflecting a red light, a green light, and a blue light, respectively, according to the present disclosure may be greater than 90%, as shown in FIG. 8. Optionally, the reflectivity of the reflecting light structures for reflecting a red light, a green light, and a blue light, respectively, according to the present disclosure may reach, for example, 92%, 95%, or 98%.

According to an embodiment of the present disclosure, a film layer having a certain thickness made of different materials may be selected for the predetermined wavelength, to achieve transmission and reflection of light with different wavelength bands. In some embodiments, the metal oxide film may include at least one selected from a group consisting of a tantalum pentoxide film, a cuprous oxide film, a ferrous oxide film, and a copper oxide film. The tantalum pentoxide film and the cuprous oxide film can be used to reflect a red light, the ferrous oxide film can be used to reflect a green light, and the copper oxide film can be used to reflect a blue light. Optionally, the metal oxide film may have a reflectivity to the light at the predetermined wavelength of 95% or more, and a transmittance to the light other than the light at the predetermined wavelength of 90% or more.

According to an embodiment of the present disclosure, a polymer film composed of a plurality of polymer layers stacked is generally formed by laminating a plurality of polymer material films. Each of polymer layer acts only on light at a predetermined wavelength, so that the spectrum of a portion of the wavelength of incident ambient light is reflected, and the spectrum of the remaining wavelength can be transmitted, thereby achieving the purpose of reflecting the single-band spectrum. For example, by arranging a plurality of polymer materials having a relatively high reflectivity to short-wavelength light and a high transmittance to long-wavelength light to be stacked, when white light is incident, it is possible to reflect only 90% or more of short-wavelength light and basically transmissive to the light beam of the remaining band, thereby being capable of forming sub-pixels of a predetermined color.

The principle of achieving single-band reflection from a polymer film composed of a plurality of polymer layers stacked is shown as follows.

Figure 9:
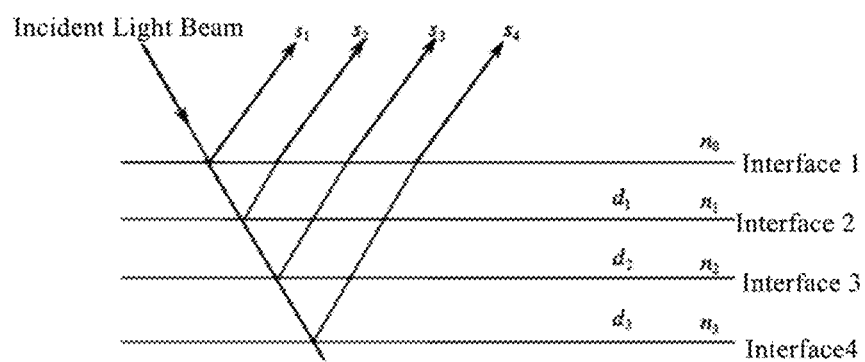
FIG. 9 is a schematic diagram showing the reflection principle of a polymer film composed of a plurality of stacked polymer layers according to an embodiment of the present disclosure.

The polymer film composed of a plurality of polymer layers stacked including three layers is taken as an example. As shown in FIG. 9, the refractive indexes of the three polymer layers are $n_1$, $n_2$, and $n_3$, respectively, and the thicknesses thereof are $d_1$, $d_2$, and $d_3$, respectively. The incident light rays are incident on the polymer film from the incident medium (refractive index is $n_0$). The light beams S1, S2, S3, and S4 reflected at the interface between the incident medium and the polymer film and at the interface between the adjacent two polymer films are coherent light, and interference occurs. When the optical path difference between the two light beams is an integer multiple of the wavelength, a constructive interference occurs, and the reflected light intensity increases. For example, taking S1 and S2 light beams as an example, the optical path difference $\Delta=2*n_1*d_1=k*\lambda$ (K=0, 1, 2 ... ), a constructive interference occurs. Therefore, by adjusting the refractive index and thickness of each of the polymer layers, it is possible to achieve reflection enhancement of the light of a certain predetermined wavelength, while achieving transmission of the light other than the light at the predetermined wavelength.

In some implementations, in each of the polymer film composed of the plurality of polymer layers stacked, the reflectivity to the light at the predetermined wavelength is greater than the reflectivity to the light at other wavelengths than the predetermined wavelength, the thickness is a quarter of the predetermined wavelength, and the refractive index of each polymer layer gradually decreases in a direction from the base to the polymer film. Therefore, the structure for reflecting light can effectively achieve enhanced reflection of the light at the predetermined wavelength, so that the structure for reflecting light can achieve a very high reflectivity to light at a predetermined wavelength, such as a reflectivity higher than 95%, and a relatively higher transmittance to the light other than the light at the predetermined wavelength, such as a transmittance higher than 95%.

The specific material for forming the polymer layer can be flexibly selected according to factors such as the refractive index. According to embodiments of the present disclosure, the specific material for forming the polymer layer includes, but are not limited to, polyvinyl alcohol compounds, acrylic copolymers, and the like. The material for forming the polymer layer is widely available, easy to obtain, and low in cost, and at the same time, can achieve a good monochromatic light reflection effect.

The aluminum film has a relatively good reflection effect, and the non-ferrous metal ions doped in the aluminum layer can achieve a relatively higher reflectivity to the light at the predetermined wavelength while having a relatively higher transmittance to the light of other wavelengths than the predetermined wavelength. In some embodiments, the aluminum film doped with non-ferrous metal ions includes an aluminum doped with cuprous ions, an aluminum doped with ferrous ions, and an aluminum doped with copper ions. The aluminum film doped with cuprous ions has a relatively higher reflectivity to the red light beam, and the aluminum layer doped with ferrous ions has a good reflection effect on the green light beam, and the aluminum layer doped with copper ions has an ideal reflection effect on the blue light beam. Therefore, the above metal film can effectively realize the color display of the three primary colors.

Figure 10:
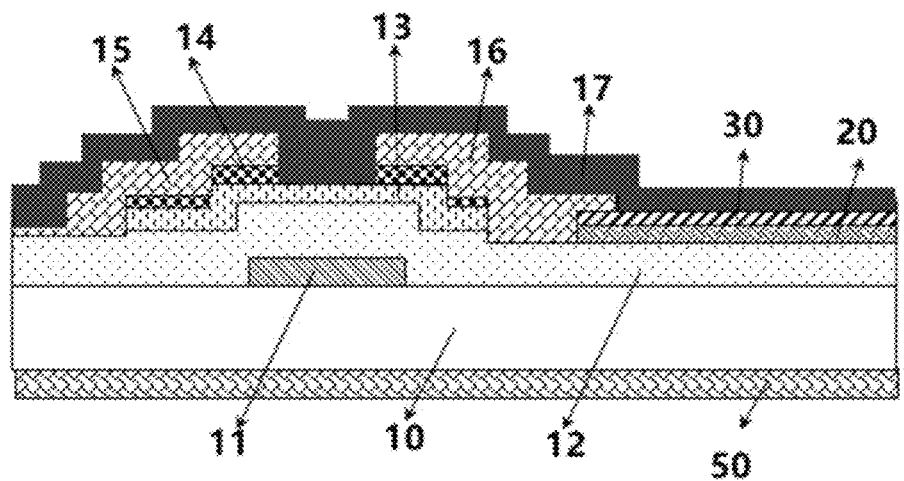
FIG. 10 is a schematic view showing an array substrate according to another embodiment of the present disclosure.

In order to prevent the ineffective light from affecting the display effect, the array substrate may be provided with a member having a light absorbing effect. In some embodiments, as shown in FIG. 10, the array substrate further includes a light absorbing layer 50 arranged on a surface of the base 10 away from the pixel electrode 20. Optionally, the material of the light absorbing layer 50 may be a black resin. In other embodiments, the structure for reflecting light 30 is arranged on a surface of the pixel electrode 20 away from the base 10, and the pixel electrode 20 may be subjected to a blackening treatment so that the pixel electrode has a light absorbing effect. Optionally, a ferrous metal layer may be formed on the transparent electrode layer to blacken the pixel electrode, that is, the pixel electrode includes a transparent conductive oxide layer and a ferrous metal layer that are laminated. Optionally, the transparent conductive oxide layer includes, but is not limited to, an indium tin oxide layer, an indium zinc oxide layer, or the like. Optionally, the ferrous metal layer includes, but is not limited to, a metal molybdenum layer or the like. In still other embodiments, the structure for reflecting light 30 is arranged on a surface of the common electrode 40 away from the base 10, and the common electrode 40 may be subjected to a blackening treatment so that the common electrode 40 has a light absorbing effect. The specific operations may be same as those of the pixel electrode described above, and will not be described herein.

One skilled in the art will appreciate that the array substrate may further include the necessary structures and components possessed by other conventional array substrates, in addition to the base, pixel electrode, reflective light structure, and common electrode described above. For example, the array substrate may further include thin-film transistors, wirings, and the like. Other structural components can be set with reference to a conventional array substrate, and will not be described again here. According to an embodiment of the present disclosure, the array substrate may have a structure of an array substrate suitable for different types of display panels. In some embodiments, the array substrate may be suitable for a TN type liquid crystal display panel (as shown in FIGS. 2 and 3). The TN type liquid crystal display panel has a large aperture ratio and a high reflectivity, and is particularly suitable as a reflective display panel. In some embodiments, the array substrate may be suitable for an ADS type liquid crystal display panel (as shown in FIGS. 4 to 7), and the like.

In another aspect of the present disclosure, the present disclosure provides a method for preparing the above array substrate for a reflective display panel, including: forming a pixel electrode and a structure for reflecting light on the base by a patterning process, in which the structure for reflecting light is configured to reflect light at a predetermined wavelength and allow light other than the light at the predetermined wavelength to transmit therethrough. Therefore, the steps of the preparation method are simple and convenient, have high compatibility with the prior art, do not require additional equipments, and are easy to realize industrial production.

In the present disclosure, the above-mentioned "patterning process" refers to a process, in which when a patterned structure is to be produced, an entire layer structure is formed in advance, and then subjected to a patterning process by an etching and other processes. Taking the pixel electrode as an example, the patterning process includes: first forming an entire conductive layer; then etching the conductive layer with a mask; and thereby forming a pixel electrode.

According to a specific embodiment of the present disclosure, the step of forming the pixel electrode may be: first, forming an entire conductive layer by a method such as chemical vapor deposition or physical vapor deposition (including but not limited to evaporation, etc.), then forming a photoresist layer on the conductive layer, sequentially exposing and developing the photoresist layer to form a patterned photoresist, etching the conductive layer not covered by the patterned photoresist, and then stripping the patterned photoresist.

The structure for reflecting light reflecting the light with different wavelengths can be composed of different materials, and thus can be formed in steps; and the structure for reflecting light that reflects the light of the same wavelength can be formed in one step. In some embodiments, the specific step of forming the structure for reflecting light may be: forming an entire reflective film by a method such as chemical vapor deposition or physical vapor deposition (including but not limited to evaporation, etc.), then forming a photoresist layer on the reflective film, sequentially exposing and developing the photoresist layer to form a patterned photoresist, etching the reflective film not covered by the patterned photoresist, and then stripping the patterned photoresist. In other embodiments, the structure for reflecting light includes a plurality of layers arranged stacked, and a plurality of the entire reflective film layers may be sequentially formed, and then an etching step is performed. One skilled in the art can understand that the structure for reflecting light reflecting light with different wavelengths can be performed according to the above steps, and is not described herein again.

According to some embodiments of the present disclosure, the structure for reflecting light is arranged on a surface of the pixel electrode proximate to the base or on a surface of the pixel electrode away from the base, and the pixel electrode and the structure for reflecting light are formed by one mask. According to further embodiments of the present disclosure, the structure for reflecting light is arranged on a surface of the common electrode proximate to the base or on a surface of the common electrode away from the base, and the common electrode and the structure for reflecting light are formed by one mask. Optionally, an entire conductive layer for forming an electrode (pixel electrode or a common electrode) and an entire reflective film for forming a reflective light structure may be formed, and then subjected to the above mentioned patterning process, and the entire conductive layer and the entire reflective film are patterned. Therefore, the method for preparing an array substrate can greatly simplify the steps and reduce the production cost.

The step of forming a structure for reflecting light will be illustrated by taking the follow situation as an example: the structure for reflecting light is arranged on a surface of the pixel electrode away from the base, the pixel electrode and the structure for reflecting light are formed by a mask, and color display is realized by three primary colors. In some embodiments, the structure for reflecting light is a metal oxide film. Optionally, the specific step of forming the structure for reflecting light may be shown as follows. After the conductive plating film for forming the pixel electrode is completed, a metal oxide film for forming a red sub-pixel (i.e., a film reflecting red light and transmitting other light) is further plated, then a PR glue (photoresist) is coated, the photoresist is exposed and developed, the metal oxide film and the conductive film not covered by the photoresist are formed, the photoresist is stripped to form a pixel electrode and a metal oxide film layer pattern (the metal oxide film is the same as the pixel electrode pattern), and thus the red sub-pixel is prepared; then the conductive layer and the metal oxide film for forming the green sub-pixel continue to be plated, that is, repeating the red sub-pixel preparation process, to sequentially form green sub-pixels; and blue sub-pixels are formed in a similar way. In other embodiments, the structure for reflecting light is a polymer film composed of a plurality of polymer layers arranged stacked. The step of forming the structure for reflecting light may be: sequentially plating a conductive layer for forming a pixel electrode and a plurality of polymer layers for forming the structure for reflecting light, and then performing the above-described steps of coating photoresist, exposure, development, etching, and stripping, to form a structure for reflecting light. The reflecting light structure for reflecting light of different wavelengths can be prepared separately by repeating this step. In still other embodiments, the structure for reflecting light is an aluminum film doped with non-ferrous metal ions. Optionally, the aluminum film may be formed by chemical vapor deposition or physical vapor deposition, thereby forming a structure for reflecting light. Optionally, in the above steps, the non-ferrous metal ions may be incorporated during the fabrication of the A1 target used for the deposition.

According to an embodiment of the present disclosure, the method further includes a step of forming a light absorbing layer on a surface of the base away from the pixel electrode. Optionally, this step can be performed by coating, chemical vapor deposition, physical vapor deposition, or the like. The specific operations and parameters of the method can be carried out according to a conventional process, and will not be repeated herein.

Figure 11:
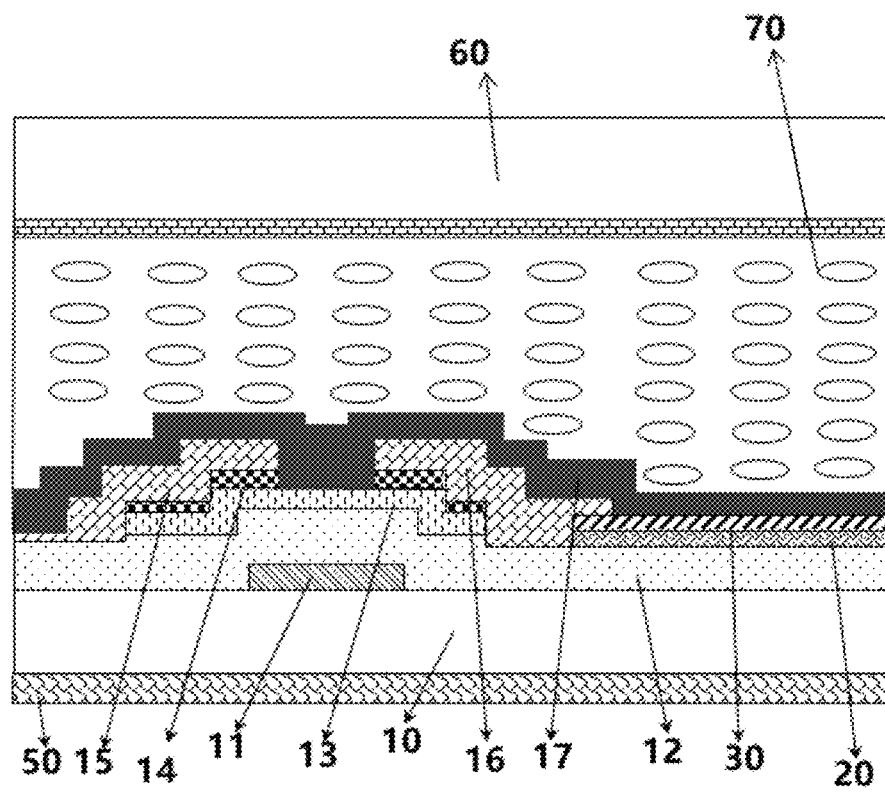
FIG. 11 is a structural view showing the structure of a display panel according to one embodiment of the present disclosure.

In another aspect of the present disclosure, the present disclosure provides a display panel, including an upper substrate and a lower substrate arranged opposite to each other, and a liquid crystal layer arranged between the lower substrate and the upper substrate, in which the lower substrate is the above array substrate. According to an embodiment of the present disclosure, referring to FIG. 11, the display panel includes an upper substrate and a lower substrate 60 arranged opposite to each other, and a liquid crystal layer 70 arranged between the lower substrate and the upper substrate 60, in which the lower substrate is the array substrate of described above.

In the display panel according to the present disclosure, a color film is not required to be arranged on the upper substrate, and the incident ambient light sequentially passes through the upper substrate and the liquid crystal layer to reach the structure for reflecting light 30. The white light is converted into a light of a predetermined color by the reflection of the structure for reflecting light 30, and thus the color display can effectively be realized. Moreover, compared with the conventional reflective display panel, the display panel only needs to undergo one reflection, rather than passing through the color film twice. Thus, this significantly improves the light utilization rate and the reflectivity; and can significantly improve the display quality of the display panel. The response speed is fast and the refresh rate is high, thereby achieving normal dynamic video display. Specifically, in the conventional reflective display panel, the transmittance of the incident white light for the first time through the color film is about 25%, and the transmittance for the second pass through the color film after the reflection is about 80% to 90%. The total two utilization rates are about 20% to 22.5%, and the light energy loss is about 80%. In the display panel of the present disclosure, the incident white light is reflected only by the structure for reflecting light once, and the reflectivity is about 30%. The light energy loss can be reduced to 70%, and the light energy utilization rate can be increased by about 50%. Therefore, the display panel of the present disclosure effectively improves the reflectivity, improves the display brightness, and improves the display effect.

Figure 12:
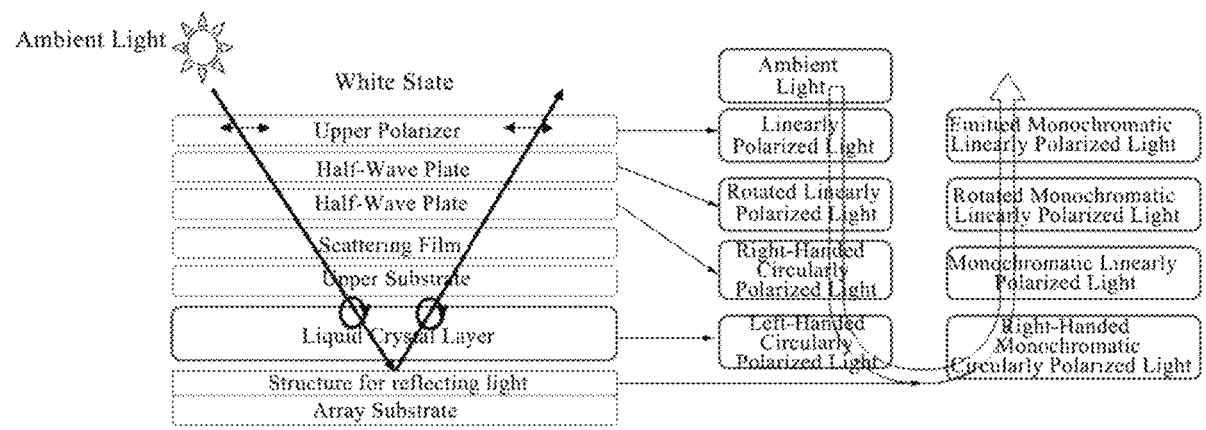
FIG. 12 is a structural view showing the display principle of a display panel according to one embodiment of the present disclosure.

According to some embodiments of the present disclosure, a scattering film, a quarter wave plate, a half-wave plate, and a polarizer are sequentially arranged on a surface of the upper substrate of the display panel away from the liquid crystal layer, and the specific light modulation principle may be referred to FIG. 12. As shown in FIG. 12, the ambient light is incident on the upper polarizer in sequence and irradiated to the structure for reflecting light, and is reflected by the structure for reflecting light and then emitted from the front surface. Specifically, in the process of light propagation, the ambient light is converted into linearly polarized light after passing through the polarizer, is rotated by the half-wave plate, and is converted into circularly polarized light through the quarter-wave plate. Then, it sequentially passes through the diffusion sheet and the upper substrate to the liquid crystal layer, is modulated and deflected by the liquid crystal layer, and is converted into a monochromatic circularly polarized light after being reflected by the structure for reflecting light. And then, it is modulated and deflected by the liquid crystal layer in sequence, is converted into linearly polarized light by a quarter-wave plate, is rotated by the half-wave plate, and then is emitted through a polarizer.

One skilled in the art can understand that in addition to the structures and components described above, the above display panel may also include other structures and components of conventional display panels, such as an alignment film, a necessary circuit structure, etc., which are not described herein again.

In the description of the present disclosure, it should be understood that the terms the terms "first" and "second" are merely used for descriptive purposes, and are not to be construed as indicating or implying a relative importance or implicitly indicating the number of technical features indicated. Thus, the features defined by "first" and "second" may include one or more of the features, either explicitly or implicitly. Unless specifically stated otherwise, in the description of the present disclosure, the meaning of "a plurality" is two or more. In the description of the present specification, the terms "one embodiment", "some embodiments", "example", "specific example", "some examples" etc., means that a particular feature, structure, material, or characteristic described with reference to this embodiment or example is included in at least one embodiment or example of the present disclosure. In the present specification, the schematic representation of the above terms does not necessarily refer to the same embodiment or example. Furthermore, the specific features, structures, materials or features may be combined in any suitable manner in any one or more embodiments or examples. In addition, various embodiments or examples described in the specification and features of various embodiments or examples may be combined without departing from the scope of the invention.

Although the embodiments of the present disclosure have been shown and described above, it is understood that the foregoing embodiments are illustrative and are not to be construed as limiting to the scope of the disclosure, and various modifications, amendments, alterations and variations of the above-described embodiments can be made by a person skilled in the art within the scope of the present disclosure.

What is claimed is:

1. An array substrate for a reflective display panel, comprising: a base; and a pixel electrode and a structure for reflecting light arranged on the base, wherein the structure for reflecting light is configured to reflect light at a predetermined wavelength and allow light other than the light at the predetermined wavelength to transmit therethrough, wherein the structure for reflecting light is an aluminum film doped with non-ferrous metal ions, and wherein the aluminum film doped with non-ferrous metal ions comprises an aluminum film doped with cuprous ions, an aluminum film doped with ferrous ions, and an aluminum film doped with copper ions.

2. The array substrate of claim 1, wherein the structure for reflecting light is arranged on a surface of the pixel electrode away from the base.

3. The array substrate of claim 1, wherein the pixel electrode is a transparent electrode, and the structure for reflecting light is arranged on a surface of the pixel electrode proximate to the base.

4. The array substrate of claim 1, wherein the array substrate further comprises a common electrode, the common electrode is arranged on a surface of the pixel electrode away from the base, and the structure for reflecting light is arranged on a surface of the common electrode away from the base.

5. The array substrate of claim 1, wherein the array substrate further comprises a transparent common electrode, the common electrode is arranged on a surface of the pixel electrode away from the base, and the structure for reflecting light is arranged on a surface of the common electrode proximate to the base.

6. The array substrate of claim 1, wherein the array substrate further comprises a light absorbing layer arranged on a surface of the base away from the pixel electrode.

7. The array substrate of claim 6, wherein a material constituting the light absorbing layer is a black resin.

8. The array substrate of claim 2, wherein the pixel electrode has a function of absorbing light.

9. The array substrate of claim 4, wherein the common electrode has a function of absorbing light.

10. The array substrate of claim 8, wherein the common electrode comprises a transparent conductive oxide layer and a ferrous metal layer that are laminated.

11. The array substrate of claim 9, wherein the pixel electrode comprises a transparent conductive oxide layer and a ferrous metal layer that are laminated.

12. A method for preparing the array substrate for a reflective display panel of claim 1, comprising:

forming the pixel electrode and the structure for reflecting light on the base by a patterning process, wherein the structure for reflecting light is configured to reflect light at a predetermined wavelength and allow light other than the light at the predetermined wavelength to transmit therethrough.

13. The method of claim 12, wherein the structure for reflecting light is arranged on a surface of the pixel electrode away from the base or on a surface of the pixel electrode proximate to the base, and the pixel electrode and the structure for reflecting light are formed by a same mask.

14. The method of claim 12, wherein the structure for reflecting light is arranged on a surface of the common electrode away from the base or on a surface of the common electrode proximate to the base, and the common electrode and the structure for reflecting light are formed by a same mask.

15. The method of claim 12, wherein the method further comprises:

a step of forming a light absorbing layer on a surface of the base away from the pixel electrode.

16. A display panel, comprising an upper substrate and a lower substrate arranged opposite to each other, and a liquid crystal layer arranged between the lower substrate and the upper substrate, wherein the lower substrate is the array substrate of claim 1.

17. The display panel of claim 16, wherein the structure for reflecting light is arranged on a surface of the pixel electrode away from the base; or the pixel electrode is a transparent electrode, and the structure for reflecting light is arranged on a surface of the pixel electrode proximate to the base.

18. The display panel of claim 16, wherein the array substrate further comprises a common electrode, and the common electrode is arranged on a surface of the pixel electrode away from the base, and wherein the structure for reflecting light is arranged on a surface of the common electrode away from the base; or the common electrode is a transparent electrode, and the structure for reflecting light is arranged on a surface of the common electrode proximate to the base.

19. An array substrate for a reflective display panel, comprising: a base; and a pixel electrode and a structure for reflecting light arranged on the base, wherein the structure for reflecting light is configured to reflect light at a predetermined wavelength and allow light other than the light at the predetermined wavelength to transmit therethrough, wherein the structure for reflecting light is a polymer film composed of a plurality of stacked polymer layers, and wherein each polymer layer in the polymer film has a reflectivity to the light at the predetermined wavelength greater than a reflectivity to the light other than the light at the predetermined wavelength, and a thickness of a quarter of the predetermined wavelength, and a refractive index of the polymer layers gradually decreases in a direction from the base to the polymer film.

* * * * *